Figure 1:
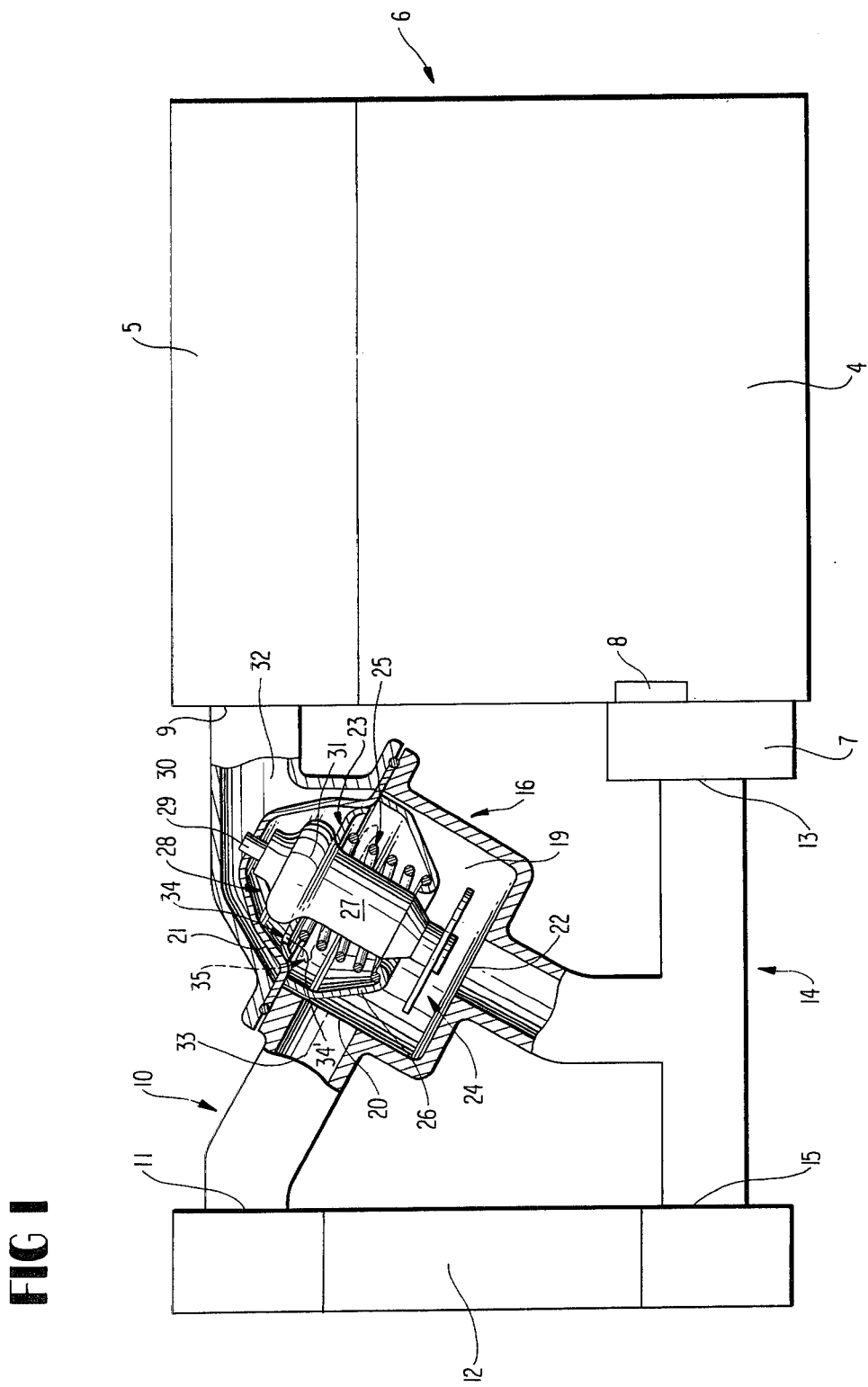

United States Patent [19]

Hass

[11] 4,288,031
[45] Sep. 8, 1981

[54] THERMOSTATIC CONTROL VALVE

[75] Inventor: Jürgen Hass, Weinstadt, Fed. Rep. of Germany

[73] Assignee: Daimler-Benz Aktiengesellschaft, Stuttgart, Fed. Rep. of Germany

[21] Appl. No.: 968,922

[22] Filed: Dec. 13, 1978

[30] Foreign Application Priority Data

Dec. 13, 1977 [DE] Fed. Rep. of Germany ....... 2755464

[51] Int. Cl.³ .......................................... G05D 23/12
[52] U.S. Cl. ................................. 236/34.5; 123/41.1; 236/93 A
[58] Field of Search .................... 236/34, 34.5, 93 A, 236/99 T, 99 K; 165/40; 123/41.09, 41.1

[56] References Cited

U.S. PATENT DOCUMENTS

| 2,400,615 | 5/1946  | Warrick et al. | 236/93 A X |
| 2,419,630 | 4/1947  | Cruzan et al.  | 236/34.5   |
| 3,510,060 | 5/1970  | Starmuhler     | 236/34.5   |
| 3,768,731 | 10/1973 | Lavado         | 236/93 A   |
| 3,935,998 | 2/1976  | Caldwell       | 236/991 C X |
| 4,055,298 | 10/1977 | Wilson         | 236/34.5   |
| 4,147,139 | 4/1979  | Hass           | 236/34.5 X |
| 4,171,767 | 10/1979 | Sliger         | 236/34.5   |

Primary Examiner—William E. Tapolcai, Jr.
Attorney, Agent, or Firm—Craig and Antonelli

[57] ABSTRACT

A thermostatic control valve for maintaining an essentially constant set value of an operating temperature of a liquid coolant conductible through a cooling jacket of an internal combustion engine with a valve chamber open to a first valve connection and with a valve controlling the coolant connection between a second valve connection and the valve chamber and a further valve controlling the coolant connection between a third valve connection and the valve chamber. A thermostatic adjusting element, responsive with adjusting movements to temperature changes, is operatively connected with the valves so as to selectively actuate the same. One of the valves is actuatable for suppression of a coolant flow in the cooling jacket by a spring means abutting a fixed thrust bearing mounted on the valve chamber with the other valve being actuatable by the adjusting element into a closed position. One of the valve connections is connectable to a suction side of a coolant pump having a pressure side connected to a cooling jacket of the internal combustion engine.

14 Claims, 3 Drawing Figures

THERMOSTATIC CONTROL VALVE

The present invention relates to a control valve and, more particularly, to a thermostatic control valve for maintaining an essentially constant set value of an operating temperature of a liquid coolant which is conductible through a cooling jacket of an internal combustion engine.

Thermostatic control valves have been proposed wherein a valve chamber is open to a first valve connection with a valve controlling the coolant connection between a second valve connection and the valve chamber in addition to a valve controlling the coolant connection between a third valve connection and the valve chamber. Two of the valve connections are connectable with a cooling jacket and the third valve connection is connectable with a radiator for dissipating the heat of the coolant. Both valves may be operatively associated with a thermostatic adjusting element which responds with adjusting movements to temperature changes in cooperation with an elastic means such as a spring. The valves are actuatable in such a manner that, in a lower temperature phase which extends up to a reference value of the operating temperature which is below the set value, the coolant flow, at least in one partial area of the cooling jacket, is essentially suppressed by virtue of the fact that one valve is brought into its closed position which blocks the valve chamber from its valve connection. In an upper temperature phase, which is adjacent to the lower reference value and which contains the set value, at least a partial volume of the coolant emerging from the cooling jacket is conducted through the radiator by means of the other valve partially blocking one of the valve connections so as to cause a diversion of coolant flow through the radiator valve connection. The other valve is brought into its closed position at an upper reference value of the operating temperature which is above the set point, in which position, the valve chamber is blocked off from the valve connection thereby causing the total volume of coolant emerging from the cooling jacket to flow through the radiator.

In thermostatic control valves of the aforementioned type, by virtue of the blocking function in the lower temperature phase, following a cold start of an internal combustion engine, the time required by the engine to reach its normal operating temperature is advantageously shortened. Moreover, the use of such a thermostatic control valve is significant in reducing pollutant emissions since it is known that the release of pollutants in the exhaust gases of the internal combustion engine is especially high during a warm-up phase operation of the engine.

In U.S. Pat. No. 1,421,830, a thermostatic control valve is proposed wherein a diaphragm chamber, filled with an expanding temperature-sensitive substance is employed as a thermostatic adjusting element with the diaphragm of the chamber being connected to a tie rod adapted to move the control valve to a closed position in the lower temperature phase or warm-up phase of the engine in order to suppress a flow of the coolant. Due to the low strength of the diaphragm, excessive forces must be prevented from acting thereon. For this purpose, specially mounted valve flaps are provided in the control valves of this proposed type to compensate for the forces acting on each valve created by the flow pressure so as to keep these forces from reaching the diaphragm.

Admittedly, a favorable feature of proposed control valves resides in the fact that the diaphragm chamber is disposed in a segment of the valve connection which segment is controlled by the valve for suppression of coolant flow in the portion of the cooling jacket which is located between the valve and a coolant outlet of the cooling jacket of the internal combustion engine. By such an arrangement, a control flow from the cooling jacket to the diaphragm chamber can be produced by bypassing the valve in the lower temperature phase or warm-up period of the internal combustion engine in order to transmit information on the temperature of the engine to the diaphram chamber in a rapid and reliable fashion despite the suppressed coolant flow. However, if other measures were not taken in such control valves, the diaphragm would be exposed or subjected to the relatively high pressure of the coolant pump when the valve was closed. Consequently, to avoid such exposure of the sensitive diaphragm to pressure of the coolant pump in the lower temperature or warm-up phase, in the proposed control valves, the coolant pump is provided with a second pressure connection with communicates with the valve connection of the control valve which is controlled by the valve for adjusting the volume of coolant conducted through the radiator. In this manner, the coolant pump produces a coolant circulation through the radiator and control valve which is disconnected from the internal combustion engine during the lower temperature phase. However, a disadvantage of this separate coolant circulation resides in the fact that it impedes the function of the control valve because the coolant pump, through its second pressure connection, is working against the flow of coolant which is fed back through the bypass, bypassing the radiator, to the cooling jacket by the control valve.

The aim underlying the present invention essentially resides in providing a thermostatic control valve of the aforementioned type which avoids a development of a coolant circulation that could influence the control function of the control valve.

In investigations which led to the present invention, it was surprisingly found that a coolant pump driven by the internal combustion engine is not damaged when the pump is forced to work against a liquid column of even the entire cooling jacket during the lower temperature phase or warm-up period of the engine.

According to advantageous features of the present invention, one valve of the thermostatic control valve is actuatable for suppressant of a coolant flow in a cooling jacket of an internal combustion engine by a spring means which abuts a fixed thrust bearing mounted on a valve chamber with the other valve being actuatable by an adjusting element into the corresponding closed position. Two valve connections are provided with one of the valve connections being connectable with the cooling jacket and the other valve connection is connectable to a suction side of a coolant pump having a pressure side connected to the cooling jacket.

In accordance with the present invention, a thermostatic control valve is provided wherein a connection is arranged between one of the two valve connections which connection serves to connect the control valve to the cooling jacket and the suction side of the coolant pump so that a false coolant circulation, separate from the internal combustion engine, is necessarily avoided.

Furthermore, by providing a thermostatic control valve wherein one of the valves is moved by a spring means into a closed position in which a flow of coolant through the cooling jacket is suppressed, advantageously, establishment of a response temperature of the thermostatic adjusting element at a lower reference value of the operating temperature of the coolant is facilitated since the material in the thermostatic adjusting element which expands must overcome the pretensioning force of the spring when the valve opens. Valve actuation of the type proposed by the present invention is insensitive to forces generated by the flow pressure of the coolant so that no special measures are required to compensate for the forces of the flow pressure as in the case of previously proposed control valve arrangements.

In accordance with yet another advantageous feature of the present invention, both valves are coaxially disposed with respect to each other with conventional thermostatic adjusting elements of the piston and cylinder design advantageously being used to operate on the two valves which may be constructed as disc valves.

With a differential pressure of the coolant pump, as in previously proposed control valves, acting upon the valve which is closed during the lower temperature phase in the opening direction to suppress a coolant flow in the cooling jacket, it is especially advantageous in accordance with the present invention, that the valve for suppressing coolant flow in the cooling jacket be disposed movably with respect to both the other valve and the adjusting element and be actuatable exclusively in the opening direction by a stop on the adjusting element. By virtue of such an arrangement, the valve for suppressing the coolant flow also functions as a safety valve. This is significant since, when the internal combustion engine is operating at a high rpm under a load, there is a danger that the inertia of the thermostatic adjusting element may result in an overheating phenomena, primarily in an area of the combustion chambers, because the adjusting element may respond too slowly or too late. In this case, the pretensioning force of the spring means is overcome by the pressure of the coolant applied to the valve so that the valve opens.

To avoid a cold-water shock in the cooling jacket of the internal combustion engine when a transition is effected from the lower to the upper temperature phase, in accordance with further advantageous features of the present invention, the valve connection, which may be shut off from the valve for suppression of the collant flow in the cooling jacket from the valve chamber, is connectable with a suction side of the coolant pump. In such an arrangement, a mixture of coolant warmed in the cooling jacket and coolant cooled in the radiator is supplied to the cooling jacket when the valve suppressing the coolant flow in its closed position is displaced to an open position. In this arrangement of the present invention, it is not necessary to construct the valve as a safety valve since the differential pressure of the coolant pump acts to close the valve and hence suppress the coolant flow.

Moreover, in accordance with the thermostatic control valve of the present invention, the coolant conduit or piping system may be constructed in such a manner that the valve connection which can be shut off from the valve chamber by the valve for the adjustment of the volume coolant to be fed through the radiator is connectable, by means of a coolant bypass line which bypasses the radiator, with a coolant outlet in the cooling jacket and may be further constructed so that the valve connection which is open to the valve chamber is connectable to the coolant outlet of the radiator.

In order to be able to draw heat from the cooling jacket for heating or warming machine assemblies or aggregates of the internal combustion engine and/or, if installed in a vehicle, to heat or warm the passenger compartment or cells, even in the lower temperature phase, in accordance with further advantageous features of the thermostatic control valve of the present invention, the valve connection which may be disconnected from the valve for the suppression of the coolant flow from the valve chamber may be connectable with the coolant outlet of the radiator and the other two valve connections may be connectable with a partial area of the cooling jacket. In this last-mentioned construction of the present invention, in order to avoid a false coolant circulation, the layout is such that the valve connection which is open to the valve chamber is connectable with a suction side of the coolant pump.

In order to make the pressure connection of the coolant pump perform only the suppression of the coolant flow in a partial area of the cooling jacket at the usual point in a lower area of the cooling jacket, advantageously, according to the present invention, the valve connection which can be disconnected from the valve for adjusting the volume of coolant fed through the radiator relative to the valve chamber may be connectable with a coolant outlet in a partial area of the cooling jacket.

Furthermore, in order to avoid providing additional thermostatic control means for the coolant flow in the remaining area of the cooling jacket, it is also advantageous in accordance with the present invention for a coolant outlet of the cooling jacket, located in a vicinity of the combustion chambers, bypassing the control valve, to be connected with the radiator and for a coolant outlet of the cooling jacket, located in a vicinity of the cylinders, bypassing the radiator, to be connected with the control valve.

In all the embodiments of the present invention, it is possible to utilize commercially available thermostatic valves in such a manner that the valves are actuatable by a cylinder filled with an expandable substance with a piston of the cylinder, subjected to an action of the expanding substance, being mounted against a thrust bearing which is immovably mounted on the valve housing. However, the reverse arrangement is also possible wherein the cylinder is mounted on the thrust bearing.

Accordingly, it is an object of the present invention to provide a thermostatic control valve for an internal combustion engine which avoids, by a simple means, shortcomings and disadvantages encountered in the prior art.

Another object of the present invention resides in providing a thermostatic control valve for an internal combustion engine which significantly shortens the time required by the engine to reach its normal operating temperature following a cold start.

A further object of the present invention resides in providing a thermostatic control valve which functions reliably under all operating conditions.

A still further object of the present invention resides in providing a thermostatic control valve which shortens the warm-up phase of the internal combustion engine without providing a false independent coolant circulation separate from the engine.

Yet another object of the present invention resides in providing a thermostatic control valve which minimizes the response of a thermostatic adjusting element so as to avoid any danger which may result due to an overheating of the engine.

A still further object of the present invention resides in providing a thermostatic control valve which is simple in construction and therefore relatively inexpensive to manufacture.

Figure 2:
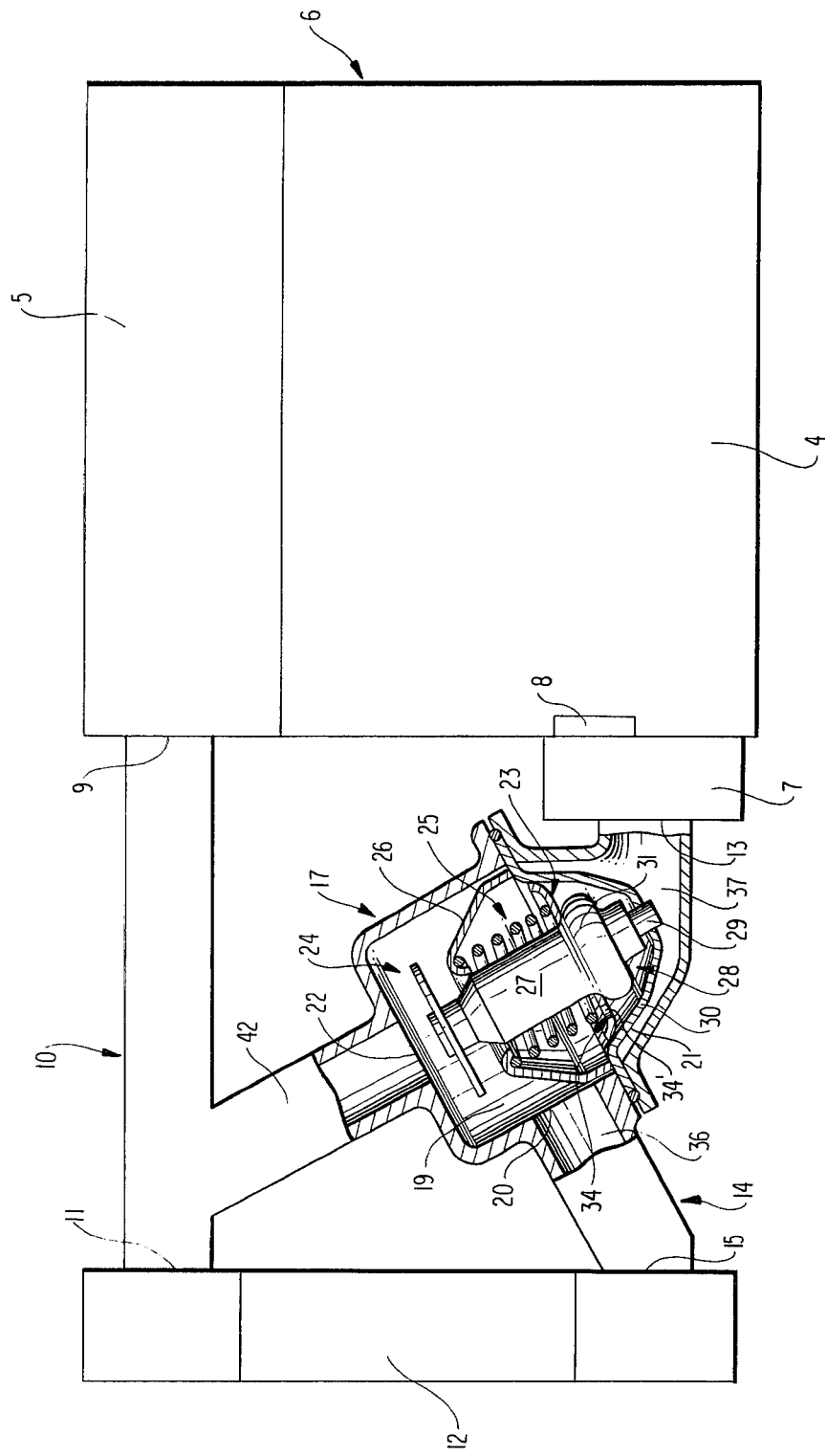
Figure 3:
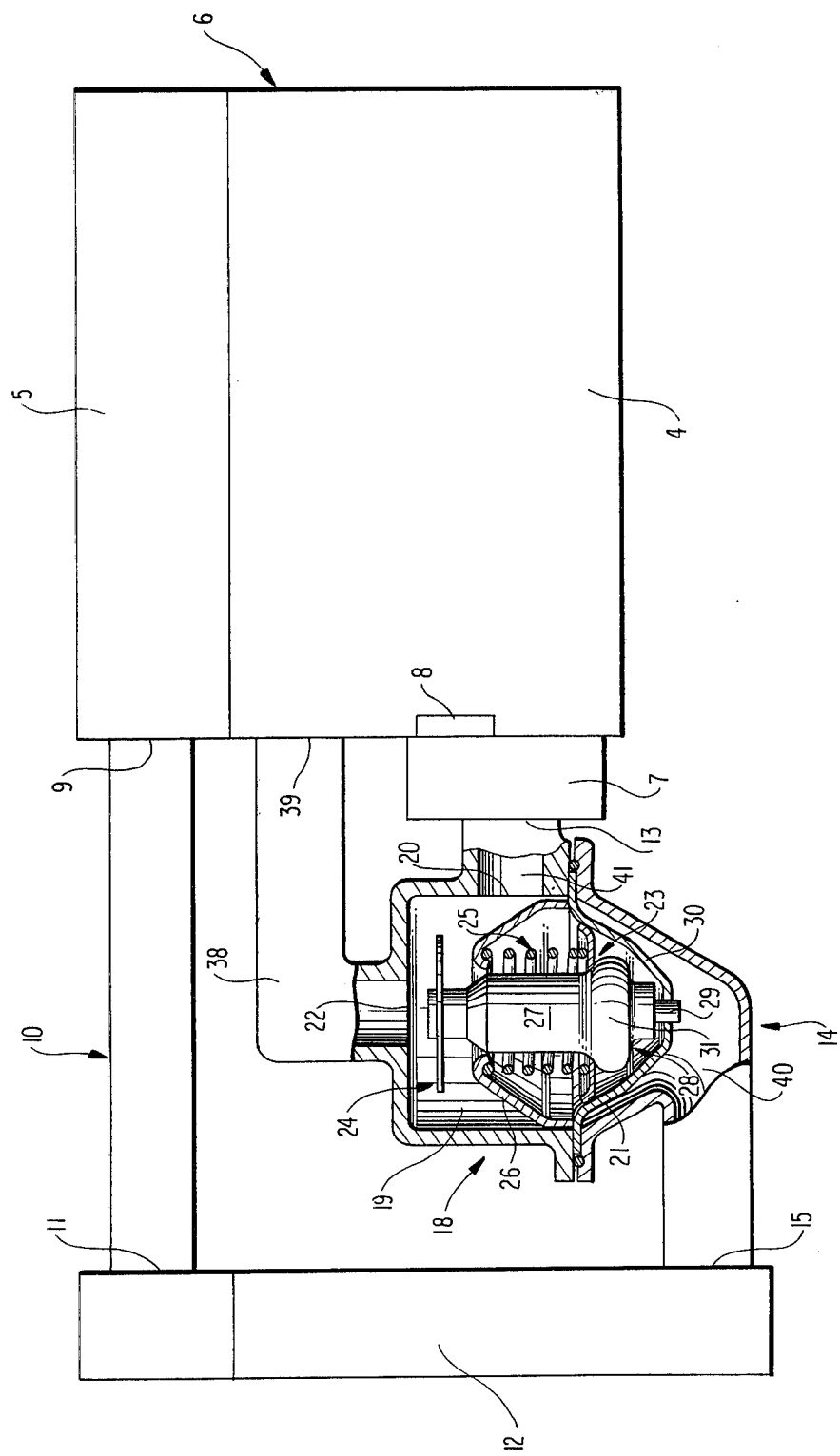

These and other objects, features, and advantages of the present invention will become more apparent from the following description when taken in connection with the accompanying drawings which show, for the purposes of illustration only, three embodiments in accordance with the present invention, and wherein:

FIG. 1 is a partially-schematic cross-sectional view of a cooling circuit of an internal combustion engine with a thermostatic control valve disposed therein in accordance with a first embodiment of the present invention;

FIG. 2 is a partially-schematic cross-sectional view of a cooling circuit of an internal combustion engine with a thermostatic control valve disposed therein in accordance with a second embodiment of the present invention; and FIG. 3 is a partially-schematic cross-sectional view of a cooling circuit of an internal combustion engine with a thermostatic control valve disposed therein in accordance with a third embodiment of the present invention.

Referring now to the drawings wherein like reference numerals are used throughout the various views and, more particularly, to FIG. 1, according to this figure, in a usual manner, an internal combustion engine generally designated by the reference numeral 6 is divided into a partial area 4 which cools the cylinders of the engine and a partial area 5 which cools the combustion chambers of the engine with the partial areas 4, 5 being traversed in succession by a coolant forced or circulated by a coolant pump 7 driven by the internal combustion engine 6. The coolant flows from an outlet stub 8 of the coolant pump 7 into a lower point of the partial area 4 of the cooling jacket. In an upper area of the partial area 5, the cooling jacket is provided with a coolant outlet 9 with the coolant outlet 9 being connected by a radiator feed line generally designated by the reference numeral 10 to a coolant inlet 11 of a radiator 12 which functions to dissipate the heat of the coolant. A suction side 13 of the coolant pump 7 is connected by a radiator return line generally designated by the reference numeral 14 with the coolant outlet 15 of the radiator 12.

In FIGS. 1-3, three embodiments of the control valve in accordance with the present invention, are illustrated with the three control valves being generally designated by the reference numerals 16, 17, and 18, respectively, with each of the embodiments having the following features in common:

A valve chamber 19, open to a first valve connection 20, may be connected by a valve generally designated by the reference numeral 23, for suppressing coolant flow in a lower temperature phase, with a second valve connection 21 and, by a valve generally designated by the reference numeral 24, for setting a volume of coolant to be fed through the radiator 12, with a third valve connection 22. The valve 23 is moved into the illustrated closed position by a pretensioned helical compression spring generally designated by the reference numeral 25 with the spring 25 abutting an arcuate thrust bearing 26 immovably fastened to the valve housing. The valve 24 is mounted on a cylinder 27 of a commercially available expandable material thermostatic adjusting element 28 which includes the cylinder 27 filled with an expandable material. A piston 29 of the thermostatic adjusting element 28 is subjected to an action of the expandable material in the cylinder 27 and is mounted on an arcuate thrust bearing 30 immovably tensioned against the valve housing. The cylinder 27 is provided with a bead or stop 31 which functions to open the valve 23 by means of the thermostatic adjusting element 28 when a lower reference value of the coolant temperature is reached. The valve 24 is closed by the cylinder 27 by the same valve travel which opens the valve 23.

As shown in FIG. 1, the control valve 16 has two valve connections 21, 22 connected to the partial areas 4, 5 of the cooling jacket with the valve connection 22 being connected to the partial area 4 by way of the suction side 13 of the coolant pump 7. The first valve connection 20 of FIG. 1 is connected with the radiator 12 while the valve connection 21 is connected with the coolant outlet 9. The first valve connecton 20 of FIG. 1 is connected with the radiator 12 by way of a connecting section 33 and radiator feed line 10.

As shown in FIG. 2, of the two valve connections 21, 22 of the control valve 17, the valve connection 21 is connected to the partial area 4 of the cooling jacket by the suction side 13 of the coolant pump 7 and the valve connection 22 is connected to the partial area 5 of the cooling jacket by the radiator feed line 10. The first valve connection 20 connects the control valve 17 with the radiator 12.

In FIG. 3, of the two valve connections 20 and 22 of the control valve 18, the valve connection 20 is connected to the partial area 4 by way of the suction side 13 of the coolant pump 7 and the first valve connection 22 is connected to the partial area 4 of the cooling jacket by a bypass line 38. The second valve connection 21 is connected with the radiator 12.

In FIG. 1, the radiator feed line 10 is sub-divided into a line section 32 which connects the second valve connection 21 with the coolant outlet 9 and a connecting section 33 which connects the valve connection 20 with the coolant inlet 11. The valve 23 is interposed between the section 32 and section 33 of the feed line 10. The third valve connection 22 is connected to the coolant return line 14 with the valve 23 being provided with a bypass connection generally designated by the reference numeral 34 which bypass connection includes one or more openings 34'. The bypass connection 34 connects the coolant outlet 9 with the suction side of the coolant pump 7 when the valve 23 is closed in order to expose the cylinder 27 of the thermostatic adjusting element 28, in the lower temperature phase, to a controlled flow of coolant from the partial area 5 of the cooling jacket which is heated by the combustion chambers of the engine 6.

Moreover, in FIG. 1, the valve 23 is constructed as a safety valve in order to be able to deflect, with respect to the cylinder 27, into an open position 35, indicated in dashed lines, under the influence of a critical pressure in the line section 32, which critical pressure corresponds to a specific rpm of the coolant pump 7 and hence that of the internal combustion engine 6. In this manner, a flow through the partial areas 4, 5 of the cooling jacket is more or less unimpeded if the expandable adjusting thermostatic element 28 has not yet responded to a rapid increase in the engine rpm under a load.

Otherwise, the control valve 16 operates in such a manner that, after a cold starting of the internal combustion engine 6, the valve 23 shuts off the coolant outlet 9 except for the control flow in the bypass connection 34 whereby the coolant pump operates against a vertical column of fluid in the partial areas 4, 5 of the cooling jacket. If the coolant temperature in partial area 5 has risen to a lower reference value of, for example, a +60° C., the cylinder 27 with its bead or stop 31 opens valve 23 so as to allow the coolant, forced into the valve chamber 19 from the coolant outlet 9, to flow, by way of valve connection 22, directly to the suction side 13 of the coolant pump with the remaining volume of the coolant, by way of valve connection 20 and connecting section 33, to the radiator 12. The volume of coolant fed through the radiator 12 is adjusted by the valve 24.

The control valve 17 in FIG. 2, as with the control valve 16, is provided with the bypass connection 34 which is formed by one or more openings 34'. The control valve 17 is connected in the coolant circuit in such a manner that the third valve connection 22, is connected with the radiator feed line 10 by a bypass line 42. The radiator return line 14, in which is arranged the valve 23, is divided into a line section 36 which connects the coolant outlet 15 of the radiator 12 with the valve connection 20 and a line section 37 which connects the valve connection 21 with the suction side 13 of the coolant pump 7. The control valve 17 operates so that the valve 23 blocks off the suction side of the coolant pump 7 during a cold start of the internal combustion engine 6 whereby the flow of coolant through the partial areas 4, 5 of the cooling jacket is suppressed except for the control flow in the bypass connection 34. When a lower reference value of the coolant temperature in partial area 5 is reached, the cylinder 27 with its bead or stop 31 opens the valve 23 whereby the coolant pump draws in both heated coolant through the valve connection 22 and coolant which has been cooled in the radiator 12 by way of the valve connection 20 and forces the mixture of these partial volumes of heated and cooled coolant through the partial areas 4, 5 of the cooling jacket. The ratio of the partial volumes of heated and cooled coolant is once again determined by the amount of displacement of the valve 24.

In FIG. 3, the control valve 18 is arranged in the coolant circuit in such a manner that the third valve connection 22 is connected with a coolant outlet 39 of partial area 4 of the cooling jacket by way of a bypass line 38 which bypasses the radiator 12. The radiator return line 14, in which is arranged the valve 23, is sub-divided into a line section 40 which connects valve connection 21 with the coolant outlet 15 of radiator 12 and a line section 41 which connects valve connection 20 with the suction side 13 of the coolant pump 7. The control valve 18 operates in such a manner that, after a cold start of the internal combustion engine 6, the valve 23 blocks off a flow of coolant from the radiator 12 and hence there is no flow in the partial area 5 of the cooling jacket whereby a bypass circulation through partial area 4 is forced by way of bypass line 38 by coolant pump 7. The bypass circulation also affects the expansion of the piston 27 of the thermostatic adjusting element 28 and, when the coolant temperature in the partial area 4 reaches a lower reference value which corresponds to a critical state in the partial area 5, the cylinder 27 with its bead or stop 31 opens the valve 23 whereby the coolant pump 7 sucks or draws in both coolant from the partial area 5 which has been cooled in the radiator 12 and coolant which has been warmed in the partial area 4 by way of the bypass line 38. The ratio of partial volumes of coolant from the radiator 12 and bypass line 38 is adjusted by the amount of displacement of the valve 24.

While I have shown and described several embodiments in accordance with the present invention, it is understood that the same is not limited thereto, but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A thermostatic control valve for maintaining an essentially constant set value of an operating temperature of a liquid coolant conductible through a cooling jacket of an internal combustion engine, the thermostatic control valve including a first, second, and third valve connection, two of the valve connections being adapted to be connected to the cooling jacket with the remaining valve connection being adapted to be connected to a radiator means for dissipating heat of the liquid coolant, a valve chamber means open to the first valve connection, a first valve means for controlling a flow of liquid coolant between the second valve connection and the valve chamber means, and a second valve means for controlling a flow of liquid coolant between the third valve connection and the valve chamber means, a thermostatic adjusting means operatively connected with said first and second valve means, said adjusting means being movable in response to predetermined temperature changes, said first and second valve means being actuatable such that, in a lower temperature phase which extends up to a lower reference value of an operating temperature which is below a predetermined operating temperature value, one of said valve means is brought into a closed position blocking the valve chamber means from one of the valve connections so as to suppress the flow of liquid coolant to at least a partial area of the cooling jacket, and, in an upper temperature phase adjacent the lower reference value containing the predetermined operating temperature value, the other of said valve means permits at least a partial volume of liquid coolant from the cooling jacket to be conducted through the radiator means, the other valve means being adapted to be brought into a closed position at an upper reference value of the operating temperature which is above the predetermined operating temperature value so as to block off the valve chamber means from one of the valve connections thereby causing a total volume of liquid coolant from the cooling jacket to flow through the radiator means, characterized in that a spring means is provided for displacing said one of said valve means to the closed position so as to block the valve chamber means and suppress a flow of liquid coolant, means are provided for mounting the spring means at the valve chamber means, the other valve means is actuatable by said adjusting means, and in that one of the two valve connectons is adapted to be connected to a suction side of a coolant pump having a pressure side connected to the cooling jacket.

2. A control valve according to claim 1, characterized in that said first and second valve means are disposed coaxially with respect to each other.

3. A control valve according to one of claims 1 or 2, characterized in that said one of said valve means for suppressing the flow of liquid coolant to at least one partial area of the cooling jacket is mounted so as to be displaceable with respect to both the other of said valve means and the thermostatic adjusting means, and in that means are provided at said thermostatic means for displacing said one of said valve means in an opening direction.

4. A control valve according to claim 3, characterized in that said means provided at said thermostatic adjusting means includes a bead provided thereon for exclusively displacing said one of said valve means in an opening direction.

5. A control valve according to claim 3, characterized in that the valve connection blocked off by said one of said valve means so as to suppress the flow of liquid coolant to at least one partial area of the cooling jacket is adapted to be connected with the suction side of the coolant pump.

6. A control valve according to claim 5, characterized in that the cooling jacket includes a cooling outlet, and in that a bypass line means for bypassing the radiator means is provided for connecting the valve connection blocked off by the other of said valve means with the coolant outlet of the cooling jacket.

7. A control valve according to claim 6, characterized in that the remaining valve connection is open to the valve chamber means and is adapted to be connected to a coolant outlet of the radiator means.

8. A control valve according to claim 3, characterized in that the thermostatic adjusting means includes a cylinder filled with a temperature responsive expandable material and a piston, said piston being subjected to an expanding action of the expandable material and being mounted on a thrust bearing immovably disposed at a housing of the control valve, and in that said first and second valve means are actuatable by the cylinder of said thermostatic adjusting means.

9. A control valve according to claim 1, characterized in that the valve connection blocked off by said one of said valve means so as to suppress a flow of liquid coolant to at least one partial area of the cooling jacket is adapted to be connected with a coolant outlet of the radiator means, and in that the other valve connections are adapted to be connected with a partial area of the cooling jacket.

10. A control valve according to claim 9, characterized in that one of the other valve connections is open to the valve chamber means and is adapted to be connected to a suction side of a coolant pump.

11. A control valve according to claim 10, characterized in that the valve connection blocked by the other of said valve means so as to adjust a volume of liquid coolant conducted through the radiator means from the valve chamber means is adapted to be connected with a coolant outlet of a partial area of the cooling jacket.

12. A control valve according to one of claims 9, 10, 11, in an internal combustion engine having a plurality of cylinders and combustion chambers, characterized in that the cooling jacket includes a coolant outlet at a first portion of the cooling jacket in a vicinity of the combustion chambers, and a coolant outlet at a second portion of the cooling jacket in a vicinity of the cylinders, and in that the control valve is arranged between the radiator means and the coolant outlet in the vicinity of the cylinders so that the control valve controls a bypassing of the radiator means.

13. A control valve according to claim 12, characterized in that the thermostatic adjusting means includes a cylinder filled with a temperature responsive expandable material and a piston, said piston being subjected to an expanding action of the expandable material and being mounted on a thrust bearing immovably disposed at a housing of the control valve, and in that said first and second valve means are actuatable by the cylinder of said thermostatic adjusting means.

14. A control valve according to one of claims 1, 2, 6, 8, or 10, characterized in that the thermostatic adjusting means includes a cylinder filled with a temperature responsive expandable material and a piston, said piston being subjected to an expanding action of the expandable material and being mounted on a thrust bearing immovably disposed at a housing of the control valve, and in that said first and second valve means are actuatable by the cylinder of said thermostatic adjusting means.

* * * * *